Figure 1:
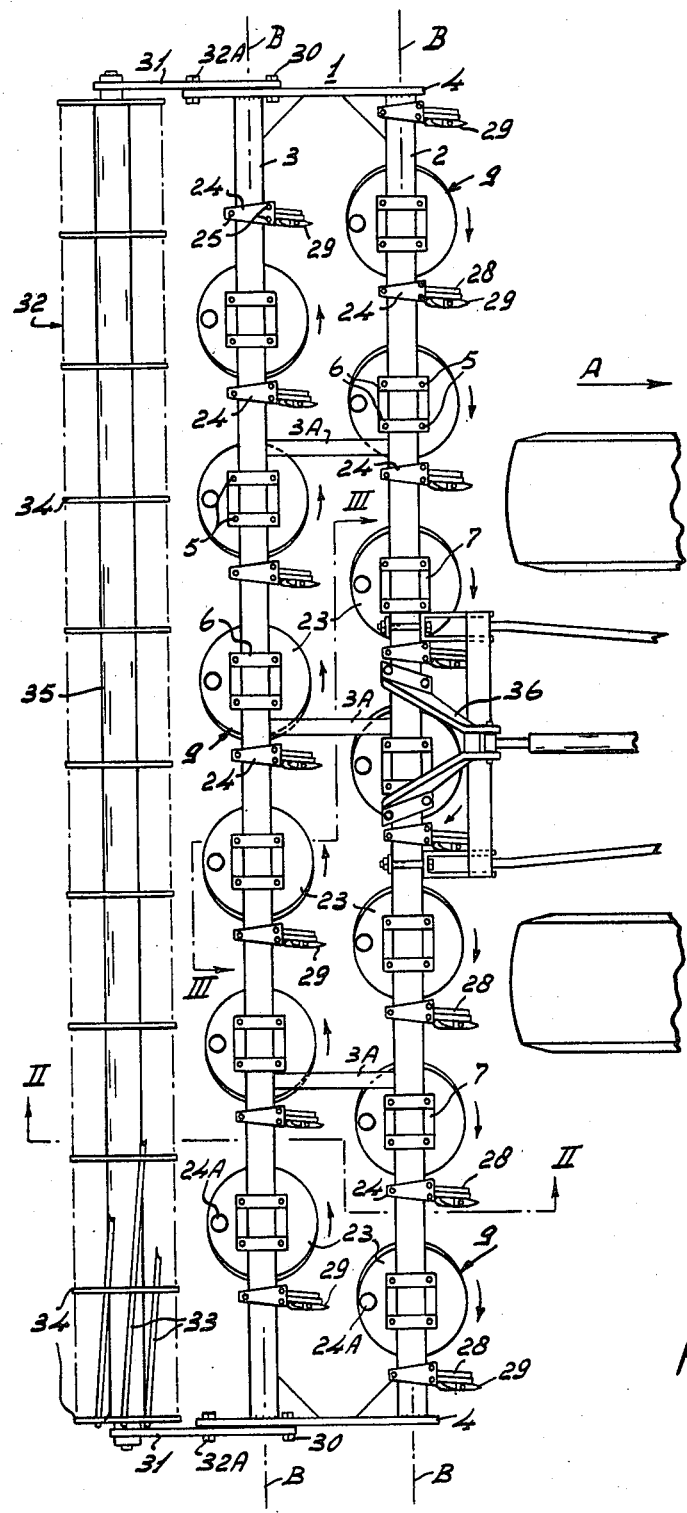

United States Patent [19]

van der Lely

[11] 4,086,965
[45] May 2, 1978

[54] SOIL CULTIVATING IMPLEMENTS
[76] Inventor: Cornelis van der Lely, 7, Brüschenrain, Zug, Switzerland
[21] Appl. No.: 688,394
[22] Filed: May 20, 1976
[30] Foreign Application Priority Data
May 21, 1975 Netherlands .......................... 7505937
[51] Int. Cl.² .............................................. A01B 21/06
[52] U.S. Cl. .................................... 172/149; 172/152; 172/169; 172/179; 172/526
[58] Field of Search ................ 172/169, 175, 177, 152, 172/174, 179, 526, 151, 523, 522, 59, 155, 156, 157, 56, 49, 111, 524, 525, 142, 145, 149

[56] References Cited
U.S. PATENT DOCUMENTS

| 465,497 | 12/1891 | Randall | 172/522 |
| 3,131,774 | 5/1964 | Lely | 172/526 |
| 3,667,551 | 6/1972 | Lely | 172/59 |
| 3,774,688 | 11/1973 | Lely | 172/59 |
| 3,783,948 | 1/1974 | Lely | 172/59 |
| 3,937,460 | 2/1976 | Lely | 172/59 |

FOREIGN PATENT DOCUMENTS

| 628,635 | 6/1963 | Belgium | 172/526 |
| 585,770 | 12/1924 | France | 172/526 |
| 69,803 | 7/1893 | Germany | 172/526 |
| 479,538 | 7/1929 | Germany | 172/59 |
| 559,062 | 3/1957 | Italy | 172/526 |

Primary Examiner—Richard J. Johnson
Attorney, Agent, or Firm—Mason, Mason and Albright

[57] ABSTRACT

A cultivator implement has two rows of freely rotatable, tined soil-working members connected to leading and rear transverse frame beams by respective brackets or plates. Each rotatable member is mounted for rotation on a corresponding stub shaft that defines its axis of rotation, which is inclined to the vertical. Pairs of downwardly extending tines that are secured in respective holders around the axis of rotation, contact the ground and rotate each member. A first row of rotatable members have axes inclined to one side of the vertical and a second row of rotatable members have axes inclined to the opposite side of the vertical. A fixed cultivator tine is deflectably secured to the beams via an integral spring coil assembly. The cultivator tines are positioned non centrally between adjacent rotary members and each tine is curved so that its lower tip extends forwardly. The cultivator tines of the first row work soil in advance of the rotatable members of the second row and the rotatable members of the first row work soil in advance of the cultivator tines of the second row to finely crumble and uniformly distribute soil. A further soil-working member is positioned to the rear of the rows and is vertically adjustable on arms connected to the ends of the beams.

12 Claims, 6 Drawing Figures

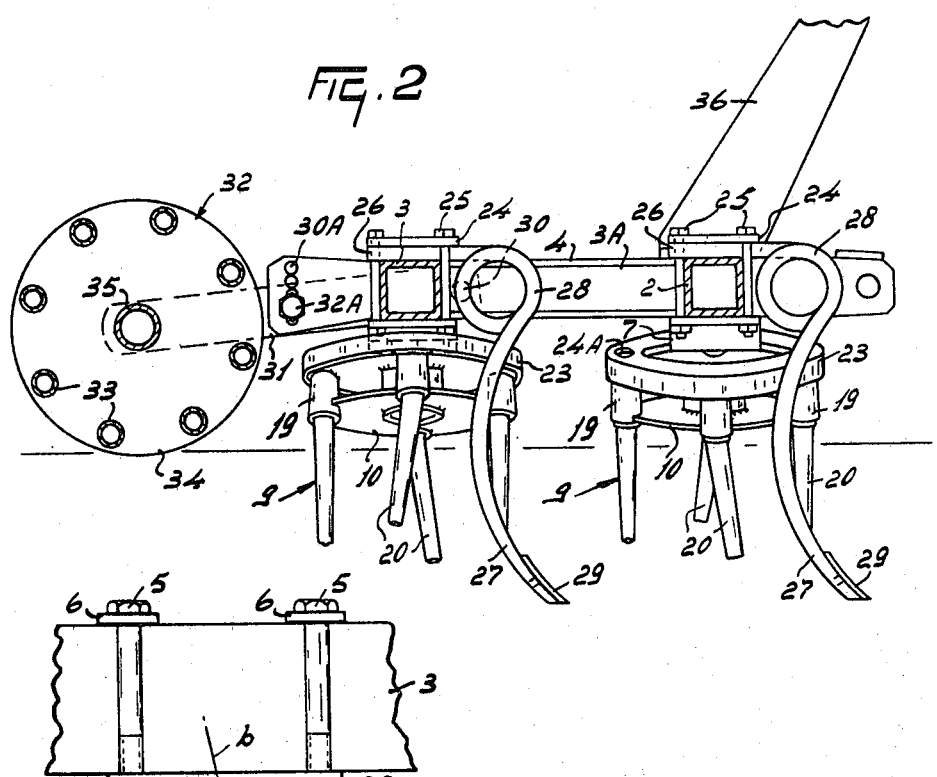
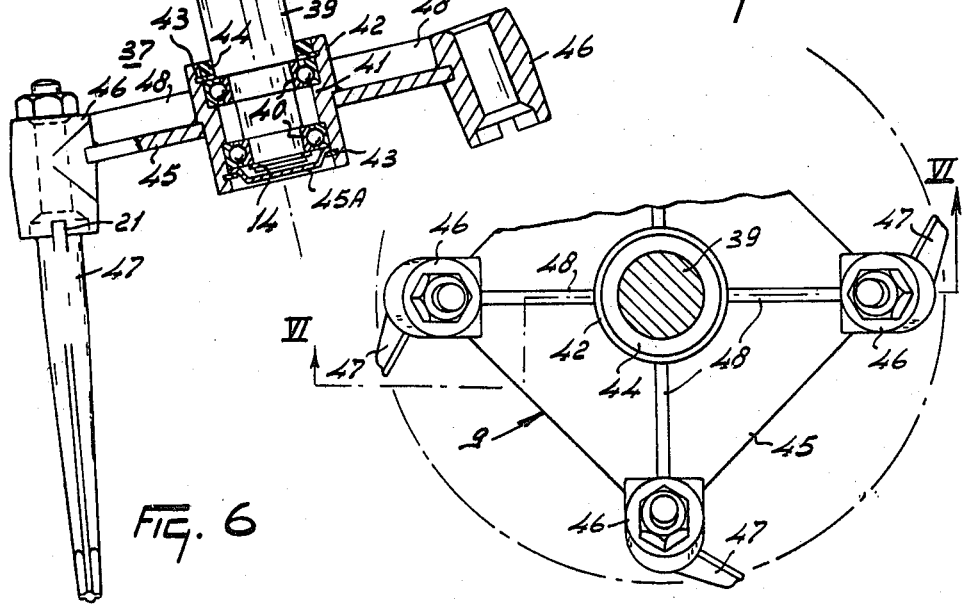

SOIL CULTIVATING IMPLEMENTS

This invention relates to soil cultivating implements of the kind which comprise a plurality of rotatable soil working or cultivating members that are arranged in at least one row which extends transverse to the intended direction of operative travel of the implement.

According to the invention, there is provided a soil cultivating implement of the kind set forth, wherein two rows of the rotatable soil working or cultivating members are provided, and wherein one of said rows is located to the rear of the other with respect to said direction, the members of the rear row being disposed in positions in which, during operation, they can co-operate with a further soil working member that is rotatable about a horizontal or substantially horizontal axis.

Figure 3:
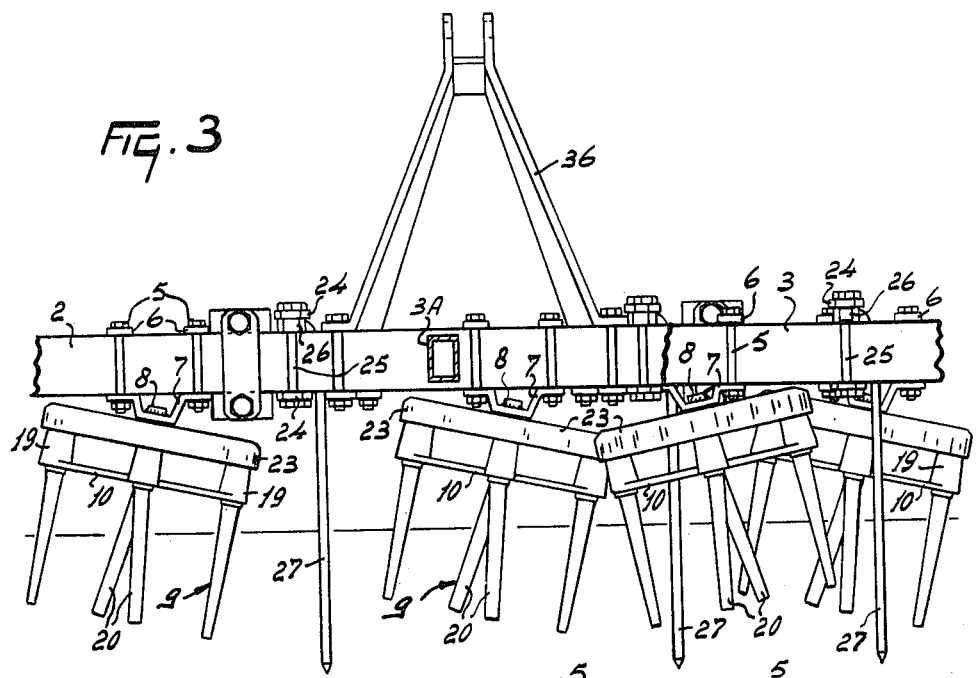
Figure 4:
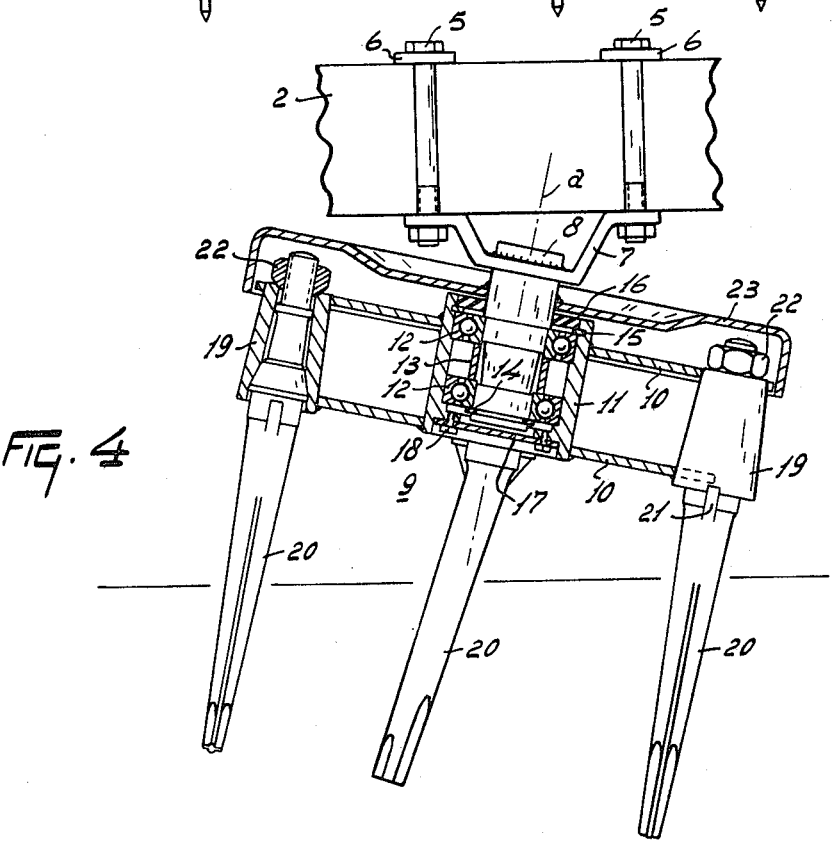

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, FIG. 3 is a section, to an enlarged scale, taken on the line III—III in FIG. 1, FIG. 4 is a part-sectional elevation, to an enlarged scale, illustrating the construction and arrangement of one soil working or cultivating member of the implement in greater detail, FIG. 5 is a part-sectional plan view, to the same scale as FIG. 4, illustrating the construction and arrangement of an alternative form of soil working or cultivating member, and FIG. 6 is a section taken on the line VI—VI of FIG. 5 omitting some parts for the sake of clarity.

Referring to FIGS. 1 to 4 of the drawings, the soil cultivating implement that is illustrated is in the form of a rotary harrow that comprises a frame portion 1 which includes two frame beams 2 and 3 that extend substantially horizontally parallel to one another in directions that are transverse, and usually perpendicular, to the intended direction of operative travel of the implement which is indicated by an arrow A in FIG. 1 of the drawings, the rear beam 3 with respect to that direction being spaced behind the leading beam 2. The spacing is maintained by parallel and substantially vertically disposed opposite side plates 4 to which the corresponding ends of the beams 2 and 3 are welded or otherwise rigidly secured. Moreover, a plurality, such as three, of supports 3A rigidly interconnect the beams 2 and 3 at more or less regular intervals between the two side plates 4. The side plates 4 are in substantially parallel relationship with the direction A and the longitudinal axes of the supports 3A are also substantially parallel to that direction. Each of the frame beams 2 and 3 is of hollow formation and polygonal cross-section, a square cross-section, as illustrated, being preferred. Whether or not the polygonal cross-section that is chosen for each beam is square, the beam concerned is so arranged that at least one flat side thereof is substantially horizontally disposed (see FIG. 2). The two side plates 4 of the frame portion 1 both extend rearwardly with respect to the direction A beyond the rear frame beam 3, the rear portions of said plates 4 being substantially sector-shaped as seen in side elevation (FIG. 2), the rearmost regions thereof having greater vertical extents than the regions thereof which extend between the beams 2 and 3.

A plurality of brackets 7 are firmly clamped to the lower substantially horizontal sides of the beams 2 and 3, said brackets 7 being regularly spaced apart from one another along the lengths of the beams 2 and 3 and each bracket 7 being firmly retained in its appointed position by four clamping bolts 5 that co-operate, at the top of the beam concerned, with two clamping plates 6 that both extend substantially parallel to the direction A in spaced apart relationship. It will be seen from FIG. 1 of the drawings that the leading beam 2 with respect to the direction A is provided with seven brackets 7 whereas the rear beam 3 has six brackets 7, the arrangement being such that, when the implement is viewed from the rear in the direction A, the brackets 7 that correspond to the beam 3 are located alternately between the brackets 7 that correspond to the leading beam 2 (see the right-hand side of FIG. 3 of the drawings). It can be seen from FIGS. 3 and 4 of the drawings that each bracket 7 has two limbs that both extend substantially parallel to the direction A at a short distance from one another. Each bracket 7 is of asymmetrical channel-shaped configuration with one limb thereof longer (from top to bottom) than the other so that the web interconnecting the two limbs has its general plane in inclined relationship with the horizontal. The web or base of each bracket 7 has the upper end of a corresponding strong stub shaft 8 welded or otherwise rigidly secured to it so that each stub shaft 8 projects downwardly from the corresponding web or base with its longitudinal axis $a$ inclined at an angle of substantially 10° to the strictly vertical as a result of the non-horizontal dispositions of the webs or bases of the brackets 7.

Each stub shaft 8 tapers downwardly away from the corresponding bracket 7 and is formed with shoulders for the rotatable mounting of a corresponding soil working or cultivating member 9 whose axis of rotation is coincident with the longitudinal axis $a$ of the stub shaft 8 concerned. The longitudinal axis of each of the two beams 2 and 3 and the longitudinal axes $a$ of the corresponding six or seven (in this embodiment) stub shafts 8 are contained in corresponding parallel vertical planes B—B that are both perpendicular to the intended direction of operative travel A. It will be noted from the drawings, and particularly from FIG. 3 thereof, that the longitudinal axes $a$ of the stub shafts 8 that correspond to one of the two frame beams 2 or 3, which axes $a$ are also the axes of rotation of the corresponding members 9, are all in substantially parallel relationship with one another, that is to say, they are all obliquely inclined downwardly from the corresponding beam 2 or 3 towards the ground surface in the same direction. However, the seven axes $a$ that correspond to the leading frame beam 2 are all inclined to the vertical in one direction whereas the six axes $a$ that correspond to the rear frame beam 3 are all inclined to the vertical in the opposite direction. In fact, when the machine is seen from the rear in the direction A (FIG. 3), the axes $a$ that correspond to the leading frame beam 2 are all inclined upwardly away from the ground to the right whereas those that correspond to the rear frame beam 3 are all inclined upwardly away from the ground to the left.

Each soil working or cultivating member 9 comprises a support which includes upper and lower parallel plates 10 that are both of annular configuration and both of which are perpendicular to the corresponding axis *a*. The inner edges of the annular plates 10 are both welded or otherwise rigidly secured to the outer surface of a cylindrical hub 11 which is freely rotatable around the corresponding stub shaft 8 with the aid of upper and lower ball bearings 12 whose inner races co-operate with the aforementioned shoulders on the tapering stub shaft 8. The inner races of the upper and lower ball bearings 12 are maintained in spaced apart relationship by an intervening sleeve 13, the inner race of the lower bearing 12 abutting against a circlip 14 that is engaged in a groove in the stub shaft 8 and the outer race of the upper ball bearing 12 abutting against a larger circlip 15 that is engaged in a groove in the inner wall of the cylindrical hub 11. As will be evident from a study of FIG. 4 of the drawings, the lower ends of the outer races of both the upper and lower ball bearings 12 are also lodged against supporting shoulders formed in the inner surface of the cylindrical hub 11. The upper surface of the upper larger circlip 15 supports, from beneath, an annular closure plate or seal 16 which is disposed just inside the upper end of the cylindrical hub 11 in surrounding relationship with the stub shaft 8. Small bolts 18 secure a generally circular closure plate 17 to an inwardly directed lip of the hub 11 so that said closure plate 17 extends perpendicular to the corresponding axis *a* immediately beneath the lower end of the corresponding stub shaft 8 and thus seals the bearings 12 from contamination by dirt from the bottom of the hub 11.

The plates 10 of each soil working or cultivating member support are provided, at regular 90° intervals around the corresponding axis *a*, with four generally sleeve-shaped tine holders 19 whose outer surfaces are substantially frusto-conical in an upwardly tapering direction. The four holders 19 that correspond to each member 9 are arranged at substantially the peripheries of the corresponding plates 10 and each holder 19 receives a fastening portion of a corresponding rigid tine 20. The open lower end of each holder 19 is formed with a pair of diametrically opposed notches or recesses and those notches or recesses co-operate with similarly disposed lugs 21 that are integrally carried at opposite sides of the corresponding tine 20. This arrangement prevents the fastening portion of the tine 20 from turning about its own longitudinal axis in the holder 19 once a frusto-conically faced fastening nut 22 which co-operates with a screw-threaded upper part of the fastening portion is securely tightened. In addition to its straight fastening portion, each tine 20 also comprises a straight soil working portion that extends downwardly away from an integral junction with the fastening portion in such a way that the longitudinal axes of said two portions are inclined to one another by a small angle which conveniently, but not essentially, has a magnitude of substantially 8°. Small arrows appear in FIG. 1 of the drawings to indicate the directions in which the freely rotatable members 9 will normally revolve during the use of the implement and an examination of FIGS. 2 to 4 of the drawings will make it clear that the soil working portions of the tines 20 are inclined rearwardly from top to bottom relative to those directions so that said portions of the tines 20 may be considered as trailing to some extent with respect to the directions of rotation concerned. As will be further discussed below, rotation of the members 9 in the indicated directions is brought about, during operative travel of the implement in the direction A, because the soil working portions of the tines 20 which, at any instant, are located at one side of each corresponding axis *a* penetrate to a considerably greater depth into the soil than do the soil working portions which, at the same instant, are at the opposite sides of the corresponding axes *a*.

The soil working portion at each tine 20 is of downwardly tapering configuration and commences, at substantially its integral junction with the corresponding fastening portion, with a substantially circular cross-section. Considered downwardly towards the free end or tip from that junction, the soil working portion gradually changes its cross-sectional shape until, near the lowermost free end or tip, that shape is basically, although not strictly, rectangular. In this lower region, the soil working portion is considerably flattened in such a way that a diagonal between those two opposite corners of the basically rectangular cross-section that are furthest apart is tangential to a circle centered upon the corresponding axis *a*. Again in a lowermost free end region of the soil working portion of each tine 20, the four what would otherwise be substantially flat sides of that portion are formed with recesses or grooves which extend upwardly along the corresponding soil working portion from its lowermost free end or tip to merge, at their upper ends, into the corresponding four substantially flat sides of the soil working portion concerned. It will be noted from FIG. 4 of the drawings that the two recesses or grooves that face generally forwardly from the soil working portion of each tine 20 with respect to the intended direction of operative rotation of the corresponding member 9 have substantially twice the upright length of those two recesses or grooves which face generally rearwardly with respect to the same direction. The recesses or grooves become progressively shallower as the distance from the lowermost free end or tip of the soil working portion of the corresponding tine 20 increases before, as mentioned above, said recesses or grooves finally merge into the substantially flat sides of the soil working portion concerned. Although it is greatly preferred that the lower region of the soil working portion of each tine 20 should be of basically rectangular cross-section, this is not absolutely essential and it is possible for other polygonal cross-sections to be employed in substitution.

Each stub shaft 8 has a corresponding protective hood or cover 23 of annular shape welded or otherwise rigidly secured to it at a short distance below the corresponding bracket 7 and immediately above the upper end of the corresponding rotatable hub 11. The hood or cover 23 protects the upper end of the hub 11 concerned and also the upper ends of the corresponding four tine holders 19 together with the corresponding fastening nuts 22 and the screw-threaded parts of the tine fastening portions with which those nuts cooperate. Each hood or cover 23 is, however, formed with a single hole 24A (FIGS. 1 and 2) through which access can be obtained to any one of the four fastening nuts 22 merely by turning the member 9 concerned about its axis of rotation *a* until the required nut is in register with the access hole 24A. In the foremost row of members 9 that corresponds to the leading frame beam 2, the brackets 7 which correspond to those two soil working or cultivating members 9 which are at the opposite ends of that row are spaced from the corresponding ends of the beam 2 by distances which are substantially half the distance between each bracket 7 and its neighbour, or one of its neighbours, along the row. However, in the rear row of members 9 that corresponds to the rear frame beam 3, the distances between the brackets 7 that support the opposite end members 9 of said row and the neighbouring ends of the beam 3 are equal to, or greater than, the distance between each bracket 7 along said row and its neighbour, or one of its neighbours, in that row. It is preferred that, in each row, the distance between one axis of rotation a and its immediate neighbour along the same row should be substantially twice the width of the strip of land that is worked by each member 9 during the operation of the implement, the latter magnitude preferably having a value of substantially 30 entimeters. It is preferred that the distances between successive axes of rotation a in each row should be the same and that the perpendicular distance between the two planes B—B, that contain the corresponding rows of axes a, should be the same as the spacings between the successive axes of rotation a in each row.

A plurality of cultivator tines 27, of which there is a total of fifteen in the example that is being described, are arranged at intervals across the width of the implement, there being one of the tines 27 close to each opposite end of each of the two beams 2 and 3 and one tine 27 between each successive pair of soil working or cultivating members 9 in each of the two rows thereof. Each cultivator tine 27 comprises a substantially horizontally disposed fastening portion 26 that is clamped firmly, but releasably, against the top of the corresponding hollow beam 2 or 3 by a corresponding upper clamping plate 24, a corresponding lower clamping plate 24 and a group of three bolts 25. The rearmost bolt 25, with respect to the direction A, of each group is entered downwardly through a hole near the rear end of the corresponding tine fastening portion 26 so that the tine 27 concerned shall still remain connected to the corresponding beam 2 or 3 even if its three bolts 25 should become loose. It will be noted from FIG. 1 of the drawings and from the right-hand side of FIG. 3 thereof, that each of the cultivator tines 27 that is fastened to the rear frame beam 3 is located substantially exactly in register, in the direction A, with the fastening region (7) of a corresponding soil working or cultivating member 9 of the leading row thereof.

Each cultivator tine 27 is preferably formed integrally with its fastening portion 26 and with an intervening helical coil 28 that preferably comprises not less than two complete 360° turns. The integral assembly of parts 26, 27 and 28 may conveniently be formed from a single length of spring steel or other resilient material which has a polygonal cross-section that it is preferred, as illustrated, should be square. Each coil 28 affords a resilient support for the corresponding cultivator tine 27 and it will be seen from FIG. 2 of the drawings that each tine 27 is initially inclined downwardly and rearwardly with respect to the direction A from its junction with the corresponding coil 28 whereafter it is arcuately curved in a regular manner in such a way that a lower region thereof is inclined downwardly and forwardly with respect to the direction A. The downwardly and forwardly extending region is gently tapered towards its free end or tip and is provided with a replaceable blade 29 which is retained in its operative position on the tine 27 by at least one countersunk machine screw or the like. If desired, the blades 29 can be formed in such a way that they are reversible, end-for-end, so that, when the initial cutting edge becomes blunt, reversal can be effected to present a fresh sharp cutting edge thus effectively doubling the life of each blade 29 before inevitable wear eventually makes complete replacement necessary. It will be noted from the drawings that, with respect to the direction A, the coil 28 that corresponds to each cultivator tine 27 is located wholly or principally behind at least upper and lower end regions of that tine 27.

Reference to FIG. 1 of the drawings will show that, in plan view, the fastening portions 26 are not located midway between the successive pairs of soil working or cultivating members 9 along the corresponding rows. The arrangement is, in fact, such that, in the leading row of members 9 that corresponds to the frame beam 2, the cultivator tines 27 are nearer to the members 9 which are to the left thereof when the implement is viewed from the rear in the direction A (see FIG. 3). This applies to all of the cultivator tine fastening portions 26 except, of course, that one which is very close to the extreme left-hand end of the frame beam 2 when the implement is viewed in the manner just indicated. Similarly, in the rear row that corresponds to the frame bear 3, the fastening portions 26 of the successive cultivator tines 27 are nearer to the members 9 which are to the left thereof when the implement is viewed from the rear in the direction A. Once again, the cultivator tine 27 that is closest to the left-hand end of the beam 3 when the implement is viewed in the direction that has just been mentioned does not have a soil working or cultivating member 9 beyond it to the left. It will be remembered that the cultivator tines 27 of the rear row are located substantially exactly in register with the soil working or cultivating members 9 of the leading row when the implement is viewed from the rear in the direction A.

Horizontally aligned pivot bolts 30, or equivalent stub shafts, turnably connect two arms 31 to the side plates 4 of the frame portion 1 in such a way that said arms 31 are turnable upwardly and downwardly about the axis defined by the pivot bolts 30 alongside the relatively remote surfaces of the two side plates 4. The sector-shaped region of each side plate 4 is formed, close to its rearmost edge, with a row of holes 30A that are equidistant from the axis defined by the pivot bolts 30 and each arm 31 is formed with at least one hole at the same distance from said axis. The arms 31 can thus be retained in chosen angular positions about the axis defined by the pivot bolts 30 by entering horizontal bolts 32A through chosen holes 30A and through the registering holes, or chosen registering holes, in the arms 31. Once the bolts 32A are tightened, a rigid disposition of the arms 31 relative to the frame portion 1 is attained. The arms 31 project rearwardly with respect to the direction A beyond the side plates 4 and, between their rearmost ends, substantially horizontally aligned bearings rotatably carry an open-formation ground roller 32 that is arranged to be rotated freely by ground contact during operative progress of the implement in the direction A. The axis of rotation that is defined by the horizontally aligned bearings is substantially parallel to the lengths of the hollow beams 2 and 3 and thus substantially perpendicular to the direction A. The roller 32 comprises a central axially disposed tubular support 35 to which a plurality, such as eleven, of vertical plates 34 of circular formation are secured at regular intervals so that all of them are parallel to the direction A. A plurality, such as eight, of holes are formed close to the periphery of each plate 34 and elongated elements 33 which may be of solid rod formation, or of tubular formation as illustrated, are entered through the holes in the successive plates 34 so as to extend helically around the axis of rotation of the roller 32 at regular intervals around that axis. The roller 32 primarily serves two functions; firstly, it acts as a further soil working member which will crush any large lumps of soil left on the ground surface by the foregoing cultivator tines 27 and members 9 with a concurrent gentle smoothing and compressing effect upon the already worked soil and, secondly, it serves a depth control function inasmuch as the level of its axis of rotation that is chosen relative to the level of the frame portion 1 substantially determines the maximum depth to which the tines 20 of the members 9 and the cultivator tines 27 can penetrate into the ground (see particularly FIG. 2). The frame portion 1 is provided, centrally across the width of the implement and at the front thereof with respect to the direction A, with a coupling member or trestle 36 that is arranged for pivotal connection to the three ends of the upper and lower lifting links of a three-point lifting device or hitch carried at the rear of an agricultural tractor or other operating vehicle in a manner which is generally known per se and which can be seen, in outline, in FIG. 1 of the drawings.

FIGS. 5 and 6 of the drawings illustrate an alternative construction in which the brackets 7 are replaced by a plurality of flat plates 38 from the lower surfaces of which corresponding stub shafts 39 project obliquely downwards towards the ground surface at an inclination to the vertical which, as in the first embodiment, may have a magnitude of substantially 10°. Each stub shaft 39 tapers downwardly in a stepped or shouldered manner towards its lowermost free end, its longitudinal axis $b$ also being the axis of rotation of a corresponding soil working or cultivating member 37 that is rotatably mounted thereon. The axis $b$ that correspond to each of the two rows of stub shafts 39 and members 37 are contained in a corresponding plane B—B as has already been described with reference to FIGS. 1 to 4 of the drawings, said planes B—B being indicated in FIG. 1 of the drawings. Each stub shaft 39 is provided with corresponding upper and lower ball bearings 40 whose inner races surround corresponding steps or shoulders of said stub shaft, the two ball bearings 40 being of different sizes. The outer races of the two ball bearings 40 are maintained in axially spaced relationship by an internal shoulder 41 of a cylindrical hub 42 of the corresponding member 37. An upper circlip 43 engages in a groove in the inner wall of the hub 42 immediately above the outer race of the upper ball bearing 40 and, immediately above said upper circlip 43, a closure plate or seal 44 of annular formation extends between the inner curved surface of the upper end of the hub 42 and the outer curved surface of the corresponding stub shaft 39 so as to prevent ingress or dirt from the upper end of the hub 42. The previously described lower circlip 14 has its inner edge entered in a groove formed very close to the lowermost end of the stub shaft 39 and maintains the inner race of the lower ball bearing 40 in its appointed position on the lowermost step or shoulder of that stub shaft. A closure plate 45A is arranged just inside the lowermost end of the hub 42 and prevents dirt from entering the internal bearing area of the hub 42 from the lower end of the latter. A lower circlip 43 has its outer edge engaged in an internal groove of the hub 42 and maintains both a lip of the closure plate 45A and the outer race of the lower ball bearing 40 in their appointed positions in said hub 42.

A circular aperture in the middle of a substantially square plate 45 is welded or otherwise rigidly secured to an external shoulder of the hub 42 of each member 37 in such a way that the general plane of said plate 45 is perpendicular, or substantially perpendicular, to the corresponding axis $b$. Each of the four corners of each plate 45 is provided with a corresponding sleeve-like tine holder 46 which receives the fastening portion of a corresponding rigid tine 47. In this embodiment, each holder 46 is of substantially, although not exactly, right circular cylindrical configuration and is welded or otherwise rigidly secured to one of the corners of the corresponding plate 45 in such a way that its longitudinal axis is in upwardly convergent relationship with the corresponding axis $b$. The tines 47 may be identical to the previously described tines 20 and their fastening portions are secured in their appointed positions in the corresponding holders 46 in an identical manner. In order to strengthen the connection of each tine holder 46 to the remainder of the corresponding member 37, substantially radially disposed stiffening ribs 48 are arranged on top of the plates 45 so as to extend rigidly between each hub 42 and upper ends of the four holders 46 that correspond to that hub.

In the use of the soil cultivating implement that has been described, its coupling member or trestle 36 is connected to the three-point lifting device or hitch at the rear of an agricultural tractor or other operating vehicle and is supported from the ground by the lifting device or hitch, by the ground roller 32 and by the tines 20 or 47 and 27, said tines penetrating into the soil to a depth that is dictated principally by the angular positions in which the arms 31 have been set by the bolts 32A about the axis defined by the pivot bolts 30. As the implement moves forwardly in the direction A, its cultivator tines 27 are dragged through the soil while the members 9 or 37 rotate more or less regularly and more or less continuously in the directions that are indicated by small arrows in FIG. 1 of the drawings, the direction of rotation for all the members 9 or 37 of the leading row being the same and the directions of rotation of all of the members 9 or 37 of the rear row being the same but opposite to those of the first row. As briefly discussed above, the rotation of the members 9 or 37 is caused by ground contact alone and results from the fact that, as seen in FIG. 3, the soil working portions of those tines 20 or 47 which, at any instant, are to the right of the corresponding axes $a$ or $b$ in the leading row and to the left of the corresponding axes $a$ or $b$ in the rear row, penetrate into the ground to a significantly greater extent than do the soil working portions of those tines 20 or 47 which, at the same instant, are at the opposite sides of the corresponding axes $a$ or $b$. Thus, the resistance to dragging motion through the soil at one side of each axis $a$ or $b$ is greater than it is at the opposite side thereof and the members 9 or 37 consequently revolve about the axes $a$ or $b$. Clearly, should the soil working portion of one of the tines 20 or 47 that is at the side of the corresponding axis $a$ or $b$ where it penetrates less deeply into the soil meet a substantially immovable obstacle, such as a firmly embedded stone, the direction of rotation of the member 9 or 37 concerned will be temporarily reversed until the obstacle has been avoided, this being conducive to non-breakage of the tines 20 and 47 and to a long working life of each member 9 or 37. The members 9 or 37 work the strips of land that are located between the cultivator tines 27, coarse lumps of soil that are displaced by those tines 27 onto said strips being crumbled up by the members 9 or 37 so that the cultivator tines 27 co-operate effectively with the rotary ground-actuated soil working or cultivating members 9 or 37.

Strips of soil that are located in between the rotary cultivating members 9 or 37 of the leading row and that are treated by the corresponding cultivator tines 27 are additionally worked by the rotary members 9 or 37 of the rear row, those members rotating in an opposite direction to the members 9 or 37 of the leading row. The arrangement of the two rows of rotary members 9 or 37 in relationship to the interposed cultivator tines 27 is such as to provide a substantially homogeneous crumbling and substantially uniform distribution of the worked soil since earth that is displaced slightly to the right by the members 9 or 37 and cultivator tines 27 of the leading row is slightly displaced back towards the left by the rotary members 9 or 37 and cultivator tines 27 of the rear row. This is conducive to a smooth and regular distribution of the displaced soil. It will be realised that, if required, the cultivator tines 27 can readily be removed from the implement merely by undoing the bolts 25. When the cultivator tines 27 are provided, as illustrated in the accompanying drawings, the implement is particularly useful for the cultivation of land that is badly infested with weeds and/or grass and/or that is contaminated with refuse from previous crops. The long roots of invasive grasses and other wholly or partially buried redundant material are torn out by the cultivator tines 27 and tend to be scraped off those tines 27 by the cooperating tines 20 or 47 of the neighbouring members 9 or 37 and the members 9 or 37 of the rear row pass them rearwardly towards the co-operating roller 32. The uprooted and crushed weeds and grass are left lying mainly on the soil surface to the rear of the implement to die off prior to any further work that may be required in preparation for the next crop that is to be grown on the land. The hoods or covers 23 effectively prevent any significant quantities of crop debris, grass, weeds and so on from becoming tightly wound around the tops of the members 9 in the embodiment of FIGS. 1 to 4 of the drawings to such an extent as to interfere significantly with the effective operation of those members 9. Where particularly difficult soil conditions and/or heavy weed infestations are likely to be met with, the even more intensive working of the soil that is possible by the use of the members 37 that have been described with reference to FIGS. 5 and 6 of the drawings may be preferable. Under many circumstances, a single traverse of the land by the soil cultivating implement that has been described is sufficient to bring that land to a condition suitable for use, without further treatment, as a seed bed or as a bed for the reception of young plants.

Although certain features of the soil cultivating implement that have been described and/or that are illustrated in the accompanying drawings will be set forth in the following claims as inventive features, it is emphasised that the invention is not necessarily limited to those features and that it includes within its scope each of the parts of each embodiment of the soil cultivating implement that has been described, and/or that is illustrated in the accompanying drawings, both individually and in various combinations.

What we claim is:

1. A soil cultivating implement comprising a frame and two rows of freely rotatable tined soil working members being mounted on said frame, a first of said rows being located in front of a second of said rows, with respect to the direction of normal travel, the soil working members in said two rows being rotatable about corresponding upwardly extending axes, the axes of rotation of those members in said first row extending substantially parallel to one another and being inclined towards one lateral side of the implement, the axes of rotation of those members in said second row extending substantially parallel to one another and being inclined towards the opposite lateral side of the implement, the axes of rotation of said soil working members being located in two planes that extend substantially perpendicular to the direction of implement travel, the distance between said two planes being substantially the same as the distance between the rotational axes of neighboring soil working members in either of said rows, and said distance being substantially twice the working width of each soil working member, a further soil working member being connected to said frame and rotatable about a substantially horizontal axis at the rear of said rows, said further member extending across the entire working width of said implement and being positioned closely adjacent the soil working members of said second row, at least one soil working member being rotatably mounted on a sub shaft and said shaft depending from a base of a corresponding bracket secured at the lower side of a substantially horizontal beam of said frame, said bracket being channel-shaped with a base extending at an angle to the horizontal and the corresponding stub shaft being inclined to the vertical.

2. An implement as claimed in claim 1, wherein said bracket has limbs that connect the base to said beam and said limbs have different lengths.

3. A soil cultivating implement comprising a frame and two rows of freely rotatable tined soil working members being mounted on said frame, a first of said rows being located in front of a second of said rows, with respect to the direction of normal travel, the soil working members in said two rows being rotatable about corresponding upwardly extending axes, the axes of rotation of those members in said first row extending substantially parallel to one another and being inclined towards one lateral side of the implement, the axes of rotation of those members in said second row extending substantially parallel to one another and being inclined towards the opposite lateral side of the implement, the axes of rotation of said soil working members being located in two planes that extend substantially perpendicular to the direction of implement travel, the distance between said two planes being substantially the same as the distance between the rotational axes of neighboring soil working members in either of said rows, and said distance being substantially twice the working width of each soil working member, a further soil working member being connected to said frame and rotatable about a substantially horizontal axis at the rear of said rows, said further member extending across the entire working width of said implement and being positioned closely adjacent the soil working members of said second row, cultivator tines being mounted on said frame and arranged noncentrally between successive rotatable soil working members along the length of at least one of said rows, said cultivator tines being located adjacent rotatable soil working members of said one row and the latter soil working members having axes of rotation inclined upwardly towards points substantially vertically and directly above said cultivator tines.

4. An implement as claimed in claim 3, wherein each rotatable member comprises a plate-shaped support and tine holders fixed adjacent the periphery of said support.

5. An implement as claimed in claim 4, wherein each support has a substantially right circular cylindrical periphery.

6. An implement as claimed in claim 5, wherein each support comprises two plates located one above the other in spaced apart relationship and each holder is fixed to the two plates.

7. An implement as claimed in claim 6, wherein the upper plate of each support has an annular cover which extends over and above said holders.

8. An implement as claimed in claim 3, wherein each cultivator tine comprises a resilient support and the tine initially extends downwardly and rearwardly with respect to the direction of travel from said resilient support and is then curved so that its lower tip extends forwardly with respect to that direction.

9. An implement as claimed in claim 8, wherein the resilient support of each cultivator tine comprises a helical coil having at least two complete 360° turns, said coil being located behind its lower free tip with respect to the direction of travel.

10. An implement as claimed in claim 3, wherein each rotatable soil working member has at least three tines which comprise lower soil working portions that are inclined downwardly and outwardly away from the corresponding axis of rotation of that member, and said member comprises support plates with the tine holders, the upper ends of said holders being located closer to the corresponding axis of rotation than the lower ends of said holders.

11. An implement as claimed in claim 3, wherein the working width of said members is about 30 cms.

12. An implement as claimed in claim 3, wherein said further soil working member has a soil contacting periphery defined by a plurality of elongate elements that extend in the same equal direction as the axis of rotation of said further member, said elongate elements extending helically around a central support of said further member and arms pivotally interconnecting that member to said frame, said arms being vertically displaceable relative to pivot connections on said frame and means retaining said arms and said further member at selected level adjustments relative to said frame.

* * * * *